Feb. 4, 1958 F. C. HUYSER 2,821,784
INSTRUMENT
Filed Sept. 11, 1956 3 Sheets-Sheet 1

INVENTOR.
FRANCIS C. HUYSER
BY
ATTORNEYS.

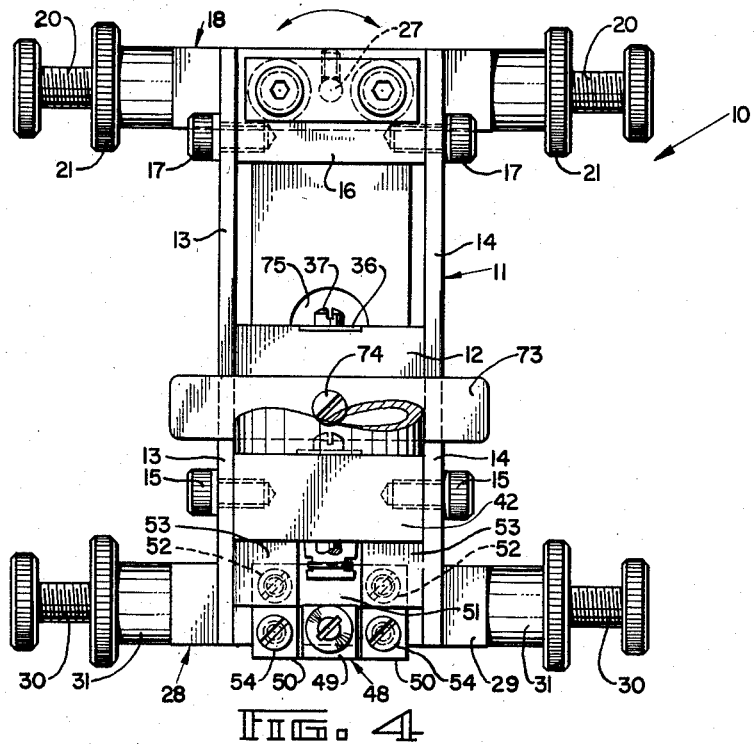
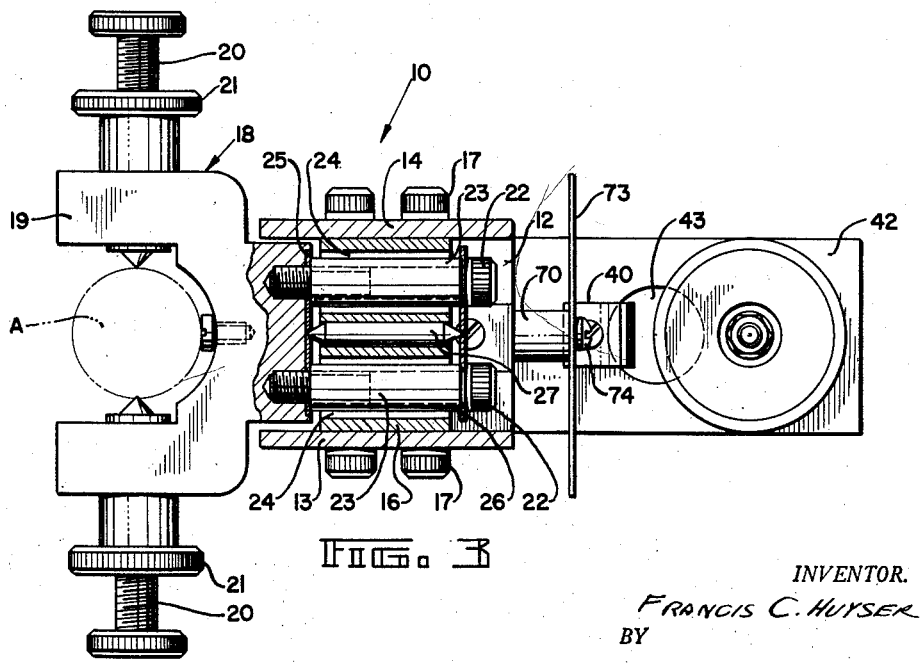

Feb. 4, 1958 F. C. HUYSER 2,821,784
INSTRUMENT
Filed Sept. 11, 1956 3 Sheets-Sheet 3
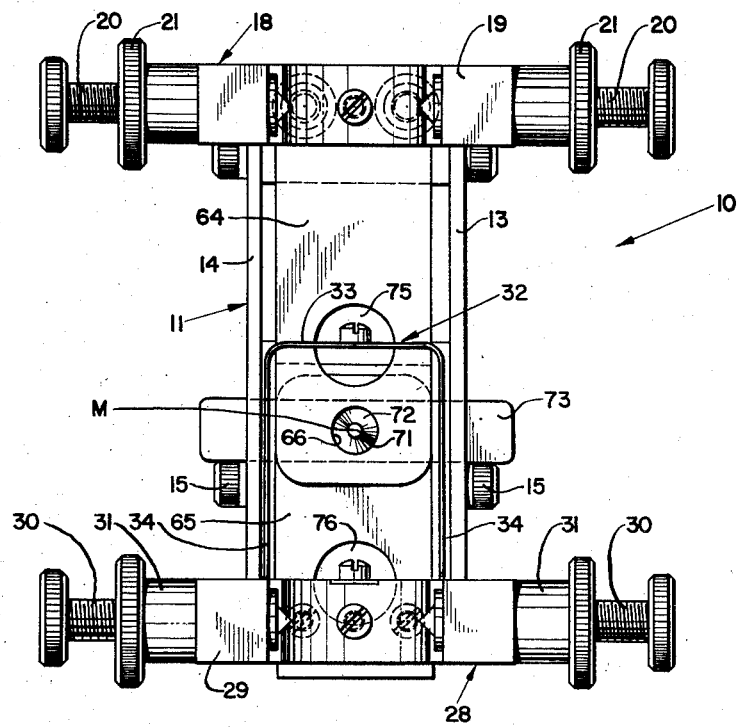
FIG. 5
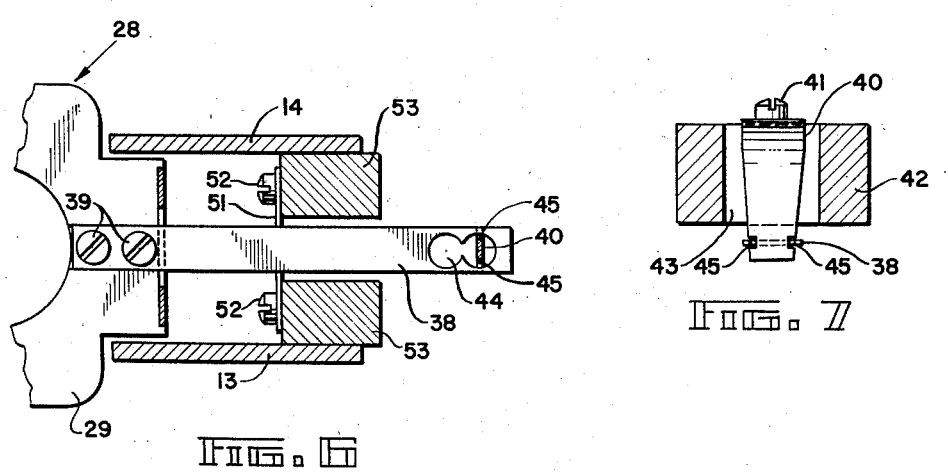
FIG. 6
FIG. 7
INVENTOR.
FRANCIS C. HUYSER
BY
Pollard Johnston Smythe Robertson
ATTORNEYS.

United States Patent Office 2,821,784
Patented Feb. 4, 1958

2,821,784

INSTRUMENT

Francis C. Huyser, Moline, Ill., assignor to American Machine and Metals, Inc., New York, N. Y., a corporation of Delaware Application September 11, 1956, Serial No. 609,117

15 Claims. (Cl. 33—148)

This invention relates generally to instruments, and more particularly is directed to improvements in extensometers for use in measuring and recording the elongations of a specimen under test in a materials testing machine.

In measuring and recording the elongations of a specimen stressed in a materials testing machine, the heads or clamps of an extensometer are secured to the specimens at locations spaced apart along the latter in the direction of the applied stress so that the heads move relative to each other in response to elongation of the portion of the specimen disposed therebetween and such relative movement of the heads can be measured and recorded as an indication of the elongation of the stressed specimen. However, the specimen frequently bends when the stress is applied thereto and, if the heads clamped to the specimen are held in alignment with each other in order to preserve the accuracy of the measuring or recording of their relative movement in the direction of the applied stress, such restriction upon the free movement of the heads with the specimen is communicated to the latter and tends to introduce discrepancies between the test data and the actual characteristics of the specimen. On the other hand, if the heads clamped to the specimen are completely free to move with the latter as the specimen bends under the applied stress, the danger exists that the relative movement of the heads will not accurately reflect the elongation of the stressed specimen in the direction of the applied stress.

Accordingly, it is an object of the present invention to provide an extensometer for use in accurately measuring and recording the elongations of a specimen stressed in a materials testing machine even when the specimen bends under the applied stress.

More specifically, an object of the invention is to provide an extensometer for the above purpose which avoids interference with elongation and bending of the specimen to which it is clamped so that the characteristics of the specimen appearing during the testing of the latter are not influenced by the presence of the extensometer, and wherein, when the specimen bends under the applied stress, the extensometer indicates an average of the elongations of the specimen at opposite sides of the neutral axis of the latter, thereby to avoid the introduction of errors in the measured and recorded elongations.

In accordance with an aspect of the invention, an extensometer includes upper and lower clamps adapted to grip a specimen at spaced apart locations along the latter and mounted on a frame for pivoting about parallel axes passing through the neutral axis of the gripped specimen, while one of the clamps is movable bodily toward and away from the other clamp with its pivoting axis travelling along a straight path, and a rockable lever connected to the bodily movable clamp at the pivoting axis of the latter so that rocking of the lever is proportional to the movement of the pivoting axis of the bodily movable clamp along its straight path and represents an average of the elongations at opposite sides of the neutral axis of a stressed specimen gripped by the clamps, whereby rocking of the lever can be used to actuate devices accurately indicating and recording elongations of the stressed specimens.

A further feature of an extensometer embodying the present invention resides in the provision of means for initially locking the clamps against relative bodily movement and pivoting during securing of the clamps upon a specimen to be stressed, and then for limiting the extent of relative bodily movement of the clamps during stressing of the gripped specimen, thereby to define the operating range of the extensometer.

In order that the invention may be fully understood, an illustrative embodiment thereof is hereinafter described in detail with reference to the accompanying drawings forming a part hereof, and wherein:

Fig. 3 is a top plan view, partly broken away and in section, of the extensometer as viewed in the direction of the arrows 3—3 on Fig. 1;

Fig. 4 is an end elevational view of the extensometer as viewed in the direction of the arrows 4—4 on Fig. 1, but with a portion of the extensometer being broken away to expose structure that would otherwise be obscured;

Fig. 5 is an end elevational view of the extensometer as viewed in the direction of the arrows 5—5 on Fig. 1;

Fig. 6 is a fragmentary horizontal sectional view taken along the line 6—6 of Fig. 1; and Fig. 7 is a fragmentary vertical sectional view taken along the line 7—7 of Fig. 1.

Figure 1:
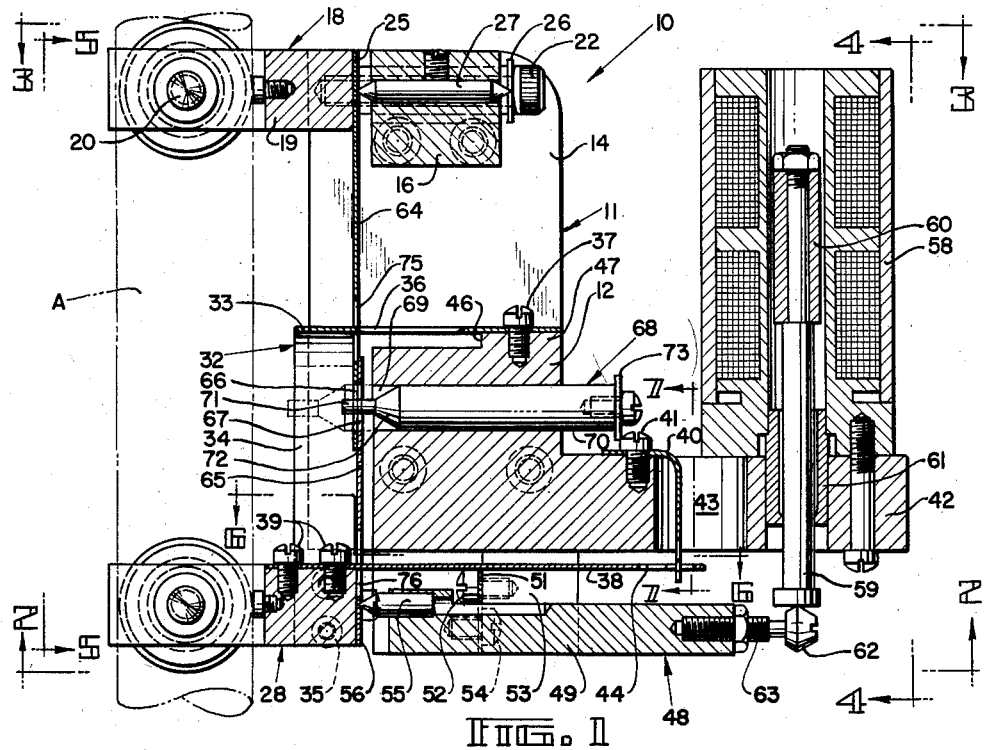
Fig. 1 is a vertical sectional view of an extensometer embodying the present invention and taken along the line 1—1 of Fig. 2.

Referring to the drawings in detail, and initially to Figs. 1 to 5, inclusive, thereof, an extensometer embodying the present invention is there generally identified by the reference numeral 10 and includes a frame 11 having a body 12 and parallel side plates 13 and 14 secured, as by machine screws 15, to opposite sides of the frame body and extending upwardly and forwardly of the latter.

A block 16 (Figs. 1, 3 and 4) is secured, as by machine screws 17, between the upper end portions of side frame plates 13 and 14, and is adapted to pivotally support an upper clamp or head which is generally identified by the reference numeral 18. The upper clamp 18 includes a yoke member 19 having clamping screws 20 with conical tips threadably extending, in axial alignment with each other, through the opposite legs of the yoke member and adapted to grip a specimen A at diametrically opposed points on the surface of the latter (Fig. 3). Knurled locking nuts 21 are preferably provided on the portions of the clamping screws 20 extending outside of the yoke member 19 for holding the clamping screws in any desired adjusted positions relative to the yoke member. The upper clamp 18 further includes a pair of spaced apart, parallel bolts 22 (Fig. 3) extending rearwardly from yoke member 19 in directions at right angles to the aligned axes of clamping screws 20 and carrying sleeves 23. The bolts 22, with sleeves 23 thereon, extend loosely, that is, with substantial radial clearance, through related bores 24 in the block 16, and bearing plates 25 and 26, spaced apart by the sleeves 23, are mounted on the bolts 22 so that the latter hold plate 25 against the back surface of yoke member 19 in front of block 16 while plate 26 is disposed in back of block 16. A pivot 27, having conical bearing points at its opposite ends, is received in a bore of the block 16 disposed midway between, and parallel to, the bores 24, while the confronting faces of bearing plates 25 and 26 have conical sockets receiving the bearing points of the pivot 27. Thus, the yoke member 19 is mounted on the block 16 while being free to pivot relative to the latter about an axis defined by the pivot 27 which extends at right angles to the aligned axes of the clamping screws 20.

The extensometer 10 also includes a lower clamp or head which is generally identified by the reference numeral 28 (Figs. 1, 2 and 5) and includes a yoke member 29 similar to the yoke member 19 and also having clamping screws 30 with conical tips threaded laterally, in axial alignment with each other, through the opposite legs of the yoke member and adapted to grip the specimen A at diametrically opposed points at a location spaced along the specimen from the location where the latter is gripped by the clamp 18. Locking nuts 31 may also be screwed on the portions of clamping screws 30 extending outwardly from yoke member 29 to hold the related clamping screws in adjusted positions relative to the yoke member 29.

Figure 2:
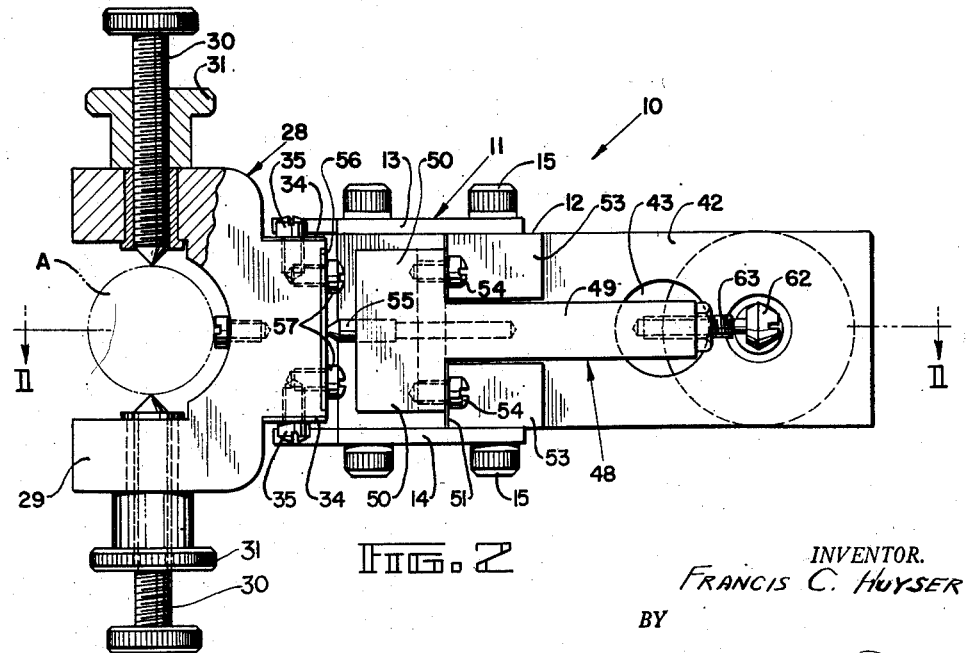
Fig. 2 is a bottom plan view of the extensometer as viewed in the direction of the arrows 2—2 on Fig. 1.

As will be appreciated from Figs. 1, 2 and 3, the clamps 18 and 28 are disposed so that the aligned axes of clamping screws 20 and the aligned axes of clamping screws 30 lie in the same plane, that is, in the plane of movement of the screws 20 resulting from rocking of yoke member 19 about pivot 27. Since the clamping screws 20 and 30 have conical tips for gripping the specimen A at diametrically opposed points on the surface of the latter, it is apparent that the specimen, when gripped by the clamping screws, is still free to rock relative to each set of clamping screws in a plane normal to the aligned axes of the related set of clamping screws, for example, as would be the case if the specimen, when stressed, did bend in the plane of the paper in Fig. 1. Further, since yoke member 19 of upper clamp 18 can itself rock about the pivot 27, the axis of which lies in the plane of the paper in Fig. 1, it is apparent that the upper clamp 18 gripping the specimen A will not resist bending of the latter in a plane perpendicular to the plane of the paper in Fig. 1, so that, in so far as the upper clamp is concerned, no resistance is interposed to bending of the stressed specimen, in whatever plane such bending may occur.

In the extensometer 10 embodying the present invention, yoke member 29 of the lower clamp 28 is also mounted to pivot about an axis extending at right angles to the aligned axes of the related clamping screws 30, so that the specimen A, when stressed, is also free to bend in any plane without resistance to such bending being offered by the lower clamp gripping the specimen. Further, in the extensometer 10, the lower clamp 28 is free to move bodily in the direction extending toward and away from the upper clamp 18, for example, in response to elongations of the portions of a stressed specimen disposed between the locations on the latter where the specimen is gripped by clamping screws 20 and 30, respectively, and, throughout such bodily movement of the lower clamp, the pivoting axis of the yoke member 29 of the latter is maintained parallel to the pivoting axis of the upper yoke member 19, as defined by the pivot 27.

The above described pivotal and bodily movement of yoke member 29 of the lower clamp of extensometer 10 is made possible by a spring suspension for yoke member 29 that includes a first resilient member, generally identified by the reference numeral 32 (Figs. 1 and 5), having an inverted U-shaped portion, defined by a cross-member 33 and parallel legs 34 depending from the opposite ends of the latter and secured at their lower ends, as by screws 35 appearing on Fig. 2, to the opposite sides of the yoke member 29, and a rearward extension 36 forming a leaf spring projecting centrally from the cross-member 33. As seen in Fig. 5, cross-member 33 of resilient member 32 is dimensioned so that the legs 34, depending therefrom and attached to the yoke member 29, will be slidably received, and therefore guided, between the portions of side frame plates 13 and 14 projecting forwardly of the body 12. Further, when the legs 34 of resilient member 32 are received, and guided, between the forward portions of side frame plates 13 and 14, the rearward extension 36 overlies the top surface of body 12 and is secured to the latter, adjacent its back end, as by a machine screw 37 (Figs. 1 and 4).

The spring suspension for yoke member 29 of the lower clamp further includes a resilient strip 38 (Figs. 1 and 6) secured at one end, as by screws 39, to yoke member 29 and extending rearwardly from the latter parallel to extension 36. Strip 38 is pivotally mounted, adjacent its back end, on a bent retaining spring 40 which is secured, as at 41, on the top surface of a rearward extension 42 of frame body 12 and which projects downwardly through an opening 43 in the extension 42, as shown particularly on Figs. 1, 3 and 7. In order to effect the pivotal connection between retaining spring 40 and strip 38 the latter has a longitudinally elongated opening 44, which may have the shape of two communicating circular apertures (Fig. 6), while the downwardly projecting portion of retaining spring 40 has a lateral width greater than the diameter of each of the circular apertures making up the opening 44 and is provided with notches 45 in the opposite side edges adjacent the lower end of retaining spring 40 (Fig. 7) for normally receiving the edge portions of strip 38 at opposite sides of opening 44, so that the lower end of the retaining spring can be moved into, or out of, the opening 44 only when the retaining spring is turned relative to strip 38 to dispose the width of the retaining spring in the direction of the longitudinal axis of strip 38 and of opening 44. When retaining spring 40 and strip 38 are in their normal relative positions, the lower end portion of spring 40 is received in the rearmost circular aperture making up opening 4 and extends diametrically thereacross, with the notches 45 of the retaining spring receiving strip 38 to prevent separation of the latter from the retaining spring while a pivoting axis for the strip 38 is defined by the spring 40 at the lateral line passing through the notches 45.

Further, it will be seen on Fig. 1 that the top surface of frame body 12, to which the resilient extension 36 is attached, has a stepped configuration to define a fulcrum for flexing of extension 36 at the front edge 46 of the raised portion 47 of the top surface.

The extensometer 10 embodying the present invention further includes a lever arrangement which is generally identified by the reference numeral 48 (Figs. 1, 2 and 4) and adapted to be rocked in response to bodily movement of lower clamp 28 in the direction toward and away from upper clamp 18.

Lever arrangement 48 includes an elongated lever member 49 having lateral projections 50 at opposite sides of the forward portion thereof (Figs. 2 and 4), and an inverted U-shaped pivot spring 51 having a laterally extending portion at the top that extends across, and is secured, for example, by screws 52 (Figs. 1 and 4), to the front faces of laterally spaced apart lugs 53 projecting downwardly from the frame body 12, while legs of the pivot spring 51, depending from the above mentioned laterally extending portion thereof, are secured, as by screws 54, to the back faces of the lateral projections 50 (Figs. 2 and 4). Thus, the pivot spring 51 rockably mounts lever member 49 on the lugs 53 depending from frame body 12, and the lower edges of the front faces of lugs 53 define the lateral axis about which lever member 49 is free to rock.

A pin 55 is mounted in the forward end portion of lever member 49 (Figs. 1 and 2) and has a pointed or conical tip engaging in a conical socket formed in a bearing plate 56 which is secured, as by screws 57, to the back end of yoke member 29. The socket of plate 56 receiving pin 55 is positioned to lie on the axis about which the lower clamp 28 is to pivot. Thus, when yoke member 29 of the lower clamp moves in the direction toward and away from the upper clamp, that is, in the vertical direction, as viewed on Figs. 1, 4 and 5, such vertical movement effects rocking of lever member 49 relative to the frame body 12, and simultaneously rocking or pivoting of yoke member 29 about its axis, which includes the point where the tip of pin 55 engages the socket of plate 56, for example, as a result of bending of the specimen A in a plane normal to the plane of the paper in Fig. 1, will not affect the extent of the rocked movement of lever member 49. Accordingly, if the specimen A bends in a plane normal to the plane of the paper in Fig. 1 during elongation of the stressed specimen, the extent to which lever member 49 is rocked will represent an average of the elongations of the specimen occurring at the opposite sides of the neutral axis of the specimen.

In order to employ rocking of lever member 49 for the measuring or recording of the averaged elongation of a stressed specimen gripped by the clamps 18 and 28, a conventional differential transformer 58 (Fig. 1) is mounted vertically upon rearward extension 42 of the frame body, and has a plunger 59 connected to its armature 60 and extending slidably through a bearing 61 in the extension 42. The lower end of plunger 59 rests upon the edge of a frusto-conical head 62 of a screw 63 that is adjustably screwed into a tapped bore in the back end portion of lever member 49. Thus, in response to rocking of lever member 49, armature 60 of differential transformer 58 is moved relative to the windings of the latter to correspondingly vary the output of the transformer, and the varied output of the transformer can be used, in a conventional manner, to operate suitably calibrated existing devices usually employed with materials testing machines and giving either a reading or recording of the elongation of the tested specimen.

The extensometer 10 embodying the present invention further includes an arrangement for initially locking the clamps 18 and 28 relative to each other during the placement of the extensometer upon a specimen to be stressed in a materials testing machine, so that the axes of the clamping screws 20 and 30, respectively, are then disposed parallel to each other with a predetermined spacing therebetween, and for limiting the possible bodily movement of lower clamp 28 relative to upper clamp 18 during operation of the extensometer, thereby to determine the operating range of the latter.

The arrangement provided in extensometer 10 for initially locking upper and lower clamps 18 and 28 relative to each other and then for determining the operating range of the extensometer includes a downwardly directed extension 64 (Figs. 1 and 5) on the bearing plate 25 of upper clamp 18, and an upwardly directed extension 65 on the bearing plate 56 of lower clamp 28. As seen in Fig. 1, extensions 64 and 65 overlap vertically, at their free end portions, and are slidable relative to each other in response to pivoting of yoke members 19 and 29 and to bodily movement of lower yoke member 29 toward and away from upper yoke member 19. The overlapping portions of extensions 64 and 65 have identical openings 66 and 67, respectively, therein, and such openings are located in the respective extensions to exactly register with each other when the axes of clamping screws 20 and 30, respectively, are parallel to each other and spaced apart by a predetermined distance.

A locking plunger 68 is slidable in a bore 69 extending horizontally through frame body 12 to project more or less from the front surface of the latter. Plunger 68 has a cylindrical body 70, with the cross-section of the latter substantially corresponding to that of the openings 66 and 67, and a relatively thin front end portion 71 connected to the body 70 by a tapering, for example, frusto-conical, intermediate portion 72 (Fig. 1). Further, bore 69 is located so that the axis of the latter is aligned with the centers of openings 66 and 67 when the latter register with each other, that is, when the axes of clamping screws 20 and 30, respectively, are parallel to each other and spaced apart by the predetermined distance. Locking plunger 68 is completed by a handle in the form of a cross-piece 73 secured to the back end of plunger body 70, as by a screw 74 (Figs. 1, 3 and 4), and the cross-piece 73 may be dimensioned to strike, at its lower edge, against the head of screw 41 securing retaining spring 40 to extension 42 (Fig. 1), so that screw 41 acts as a stop limiting rearward movement of the locking plunger to a retracted position (shown in full lines on Fig. 1) where only end portion 71 of the plunger extends into openings 66 and 67.

It is apparent that, with the locking plunger 68 in the above mentioned retracted position, the clearance between end portion 71 and openings 66 and 67 determines the possible relative movements of yoke members 19 and 29, and thereby establishes the operating range of extensometer 10. On the other hand, when plunger 68 is pushed forwardly from its retracted position to an operative or locking position (shown in broken lines on Fig. 1), the tapered intermediate portion 72, in passing through the openings 66 and 67, progressively moves the extensions 64 and 65 until openings 66 and 67 exactly register with each other, and then body portion 70 extends through openings 66 and 67 to hold the latter in exact registration.

It will be noted that plate extensions 64 and 65 have additional, relatively large openings 75 and 76, respectively, therein which are located to loosely receive the rearwardly extending parts 36 and 38, respectively, of the spring suspension for yoke member 29 (Figs. 1 and 5) so that the extensions 64 and 65 do not interfere with the action of that spring suspension.

It is apparent that, in the described spring suspension for yoke member 29 of the lower clamp or head, the inverted U-shaped portion of resilient member 32, including cross-member 33 and depending legs 34 attached to yoke member 29, acts as a guide between side frame plates 13 and 14 to ensure that the pivoting axis of yoke member 29 always lies in a vertical plane passing through the axis of pivot 27 of the upper yoke member 19. Further, since members 32 and 38 are resilient, the inverted U-shaped portion of member 32 can rock, that is, change the angles enclosed between cross-member 33 and legs 34, and the extension 36 and member 38 can twist to permit rocking of yoke member 29 about the pivoting axis extending through the point of pin 55. Although the connection of elongated resilient member 38 to yoke member 29 is disposed above the pivoting axis of the latter, the described pivotal connection of retaining spring 40 to member 38 does permit lateral swinging of the latter thereby to avoid binding of the pivoting of yoke member 29 by its connection to resilient member 38. Further, it is apparent that, as yoke member 29 moves vertically along the straight path established by the guiding cooperation of side frame plates 13 and 14 with the inverted U-shaped portion of resilient member 32, the resilient extension 36 and member 38 remain substantially parallel to each other, thereby to avoid tilting of the pivoting axis of yoke member 29 from its position parallel to the axis of pivot 27 of the upper yoke member. Accordingly, it will be seen that, in the described extensometer 10, the axes of clamping screws 20 and 30, respectively, remain in the same vertical plane, and the pivoting axes of yoke members 19 and 29 remain parallel in a vertical plane perpendicular to the plane of the clamping screws, as the lower yoke member 29 moves bodily relative to the upper yoke member 19, so that, although a specimen clamped by the screws 20 and 30 is free to bend under stress, such bending does not affect the indication of the elongations of the stressed specimen which are picked up by pin 55 of lever member 49, at the pivoting axis of the lower yoke member.

Although a particular illustrative embodiment of the invention has been described in detail herein with reference to the accompanying drawings, it is to be understood that the invention is not limited to that embodiment, and that various changes and modifications may be effected therein without departing from the scope or spirit of the invention, except as defined in the appended claims.

What is claimed is:

1. In an extensometer, the combination including upper and lower clamps adapted to grip a specimen at spaced apart locations along the latter, supporting means for said clamps, means pivotally mounting one of said clamps on said supporting means to move relative to the latter about a fixed axis, means mounting the other of said clamps on said supporting means for pivotal movement relative to said one clamp about an axis that is always parallel to said fixed axis of said one clamp and for bodily movement toward and away from said one clamp along a substantially straight path lying in a plane containing the pivoting axes of both of said clamps, and movable pick-up means mounted on said supporting means and connected to said other clamp substantially at the pivoting axis of the latter to be displaced by said other clamp in response to bodily movement of the latter along said straight path, and so that the displacement of said pick-up means is unaffected by pivotal movement of said clamps resulting from bending of a specimen gripped by the latter out of said plane containing the pivoting axes of both clamps.

2. In an extensometer, the combination including upper and lower clamps each having a pair of opposed screws for gripping diametrically opposite points on the surface of a specimen at locations spaced apart along the latter while the specimen is free to pivot relative to each clamp about the axis of the related pair of opposed screws, supporting means for said clamps, means mounting one of said clamps on said supporting means for pivotal movement relative to the latter about a fixed axis at right angles to said axis of the related pair of screws, means mounting the other of said clamps on said supporting means for pivotal movement about an axis that is at right angles to said axis of the related pair of screws and always parallel to said fixed pivoting axis of said one clamp and for bodily movement toward and away from said one clamp along a substantially straight path lying in a plane containing the pivoting axes of both of said clamps, and movable pick-up means mounted on said supporting means and connected to said other clamp at the pivoting axis of the latter so that said pick-up means is displaced in response to bodily movement of said other clamp along said straight path as an indication of the elongations of a specimen gripped by said clamps and is unaffected by pivotal movements of said clamps resulting from bending of the specimen.

3. In an extensometer, the combination including upper and lower clamps each having a pair of opposed screws for gripping diametrically opposite points on the surface of a specimen at locations spaced apart along the latter while the specimen is free to pivot relative to each clamp about the axis of the related pair of opposed screws, supporting means for said clamps, means mounting one of said clamps on said supporting means for pivotal movement relative to the latter about a fixed axis at right angles to said axis of the related pair of screws, means mounting the other of said clamps on said supporting means for pivotal movement about an axis that is at right angles to said axis of the related pair of screws and always parallel to said fixed pivoting axis of said one clamp and for bodily movement toward and away from said one clamp along a substantially straight path lying in a plane containing the pivoting axes of both of said clamps, a rockable pickup lever mounted on said supporting means for movement relative to the latter about an axis perpendicular to said plane containing the pivoting axes of both of said clamps, and means pivotally connecting said lever to said other clamp at a point on the latter lying on said pivoting axis of said other clamp so that said lever is angularly displaced relative to said supporting means in response to bodily movement of said other clamp along said straight path and is unaffected by pivotal movements of said clamps relative to each other, whereby the angular displacement of said lever is accurately indicative of the elongations of a stressed specimen gripped by said clamps with the effects of bending of the specimen under stress being averaged.

4. In an extensometer, the combination including upper and lower clamps each having a pair of opposed screws for gripping diametrically opposite points on the surface of a specimen at locations spaced apart along the latter while the specimen is free to pivot relative to each clamp about the axis of the related pair of opposed screws, supporting means for said clamps, means mounting one of said clamps on said supporting means for pivotal movement relative to the latter about a fixed axis at right angles to said axis of the related pair of screws, means mounting the other of said clamps on said supporting means for pivotal movement about an axis that is at right angles to said axis of the related pair of screws and always parallel to said fixed pivoting axis of said one clamp and for bodily movement toward and away from said one clamp along a substantially straight path lying in a plane containing the pivoting axes of both of said clamps, movable pick-up means mounted on said supporting means and connected to said other clamp at said pivoting axis of the latter to be displaced relative to said supporting means in response to bodily movement of said other clamp along said straight path and to be unaffected by pivoting of said clamps relative to each other resulting from bending, out of said plane containing the axes of both clamps, of a stressed specimen gripped by the latter, and differential transformer means actuated by said pick-up means to emit varying electrical currents, corresponding to displacements of said pick-up means, for operating means indicating elongations of a stressed specimen gripped by said clamps.

5. In an extensometer the combination including upper and lower clamps adapted to grip a specimen at spaced apart locations along the latter, supporting means for said clamps, means pivotally mounting one of said clamps on said supporting means to move relative to the latter about a fixed axis, means mounting the other of said clamps on said supporting means for pivotal movement relative to said one clamp about an axis that is always parallel to said fixed axis of said one clamp and for bodily movement toward and away from said one clamp along a substantially straight path lying in a plane containing the pivoting axes of both of said clamps, a rockable lever mounted on said supporting means for angular displacement relative to the latter about an axis perpendicular to said plane containing the pivoting axes of both clamps, means pivotally connecting said lever to said other clamp at said pivoting axis of the latter so that said lever is angularly displaced only by bodily movement of said other clamp along said straight path, and means actuated by said rockable lever for controlling a device indicating elongations of a stressed specimen gripped by said clamps as functions of the angular displacements of said lever.

6. In an extensometer, the combination including upper and lower clamps each having a pair of opposed screws for gripping diametrically opposite points on the surface of a specimen at locations spaced apart along the latter while the specimen is free to pivot relative to each clamp about the axis of the related pair of opposed screws, a frame, means mounting one of said clamps on said frame for pivotal movement relative to the latter about an axis which is fixed with respect to said frame and extends at right angles to said axis of the related pair of screws, part of said frame defining a straight guideway extending at right angles to the pivoting axis of said one clamp, mounting means movable along said guideway and supporting the other of said clamps from said frame for pivoting about an axis which is movable with said mounting means along said guideway and which is parallel to said pivoting axis of said one clamp and lies in a plane containing the longitudinal axis of said guideway and said pivoting axis of said one clamp, and a rockable lever mounted on said frame for angular displacement relative to the latter about an axis perpendicular to said plane and having a pivotal connection to said other clamp at the pivoting axis of the latter so that angular displacement of said lever is a function of, and occurs in response to, only the movement of said other clamp with said mounting means along said guideway.

7. In an extensometer, the combination including upper and lower clamps each having a pair of opposed screws for gripping diametrically opposite points on the surface of a specimen at locations spaced apart along the latter while the specimen is free to pivot relative to each clamp about the axis of the related pair of opposed screws, supporting means for said clamps, means mounting one of said clamps on said supporting means for pivotal movement relative to the latter about a fixed axis at right angles to said axis of the related pair of screws, means mounting the other of said clamps on said supporting means for pivotal movement about an axis that is at right angles to said axis of the related pair of screws and always parallel to said fixed pivoting axis of said one clamp and for bodily movement toward and away from said one clamp along a substantially straight path lying in a plane containing the pivoting axes of both of said clamps, movable pick-up means mounted on said supporting means and connected to said other clamp at the pivoting axis of the latter so that said pick-up means is displaced in response to bodily movement of said other clamp along said straight path as an indication of the elongations of a specimen gripped by said clamps and is unaffected by pivotal movements of said clamps resulting from bending of the specimen, and locking means operative, in one position, to hold said clamps with the axes of the related pairs of screws parallel to each other and spaced apart by a predetermined distance and, in another position, to limit the movement of said other clamp toward and away from said one clamp for determining the operating range of the extensometer.

8. In an extensometer, the combination including upper and lower clamps each having a pair of opposed screws for gripping diametrically opposite points on the surface of a specimen, said clamps being arranged with the axes of their respective pairs of screws lying in a common flat plane and spaced apart to grip a specimen at locations spaced apart along the latter, a frame, means mounting said upper clamp on said frame for pivoting relative to the latter about an axis which is perpendicular to said flat plane containing the axes of the pairs of screws, means on said frame defining parallel sides of a guideway which extends perpendicular to said pivoting axis of the upper clamp, resilient suspension means mounting said lower clamp on said frame and constrained between said sides of the guideway to permit bodily movement of the lower clamp only in the direction of the longitudinal axis of said guideway while permitting pivotal movement of said lower clamp about an axis that remains parallel to said pivoting axis of the upper clamp and that lies in a plane containing both said pivoting axis of the upper clamp and the longitudinal axis of said guideway, and a rockable lever mounted on said frame for angular displacement about an axis perpendicular to said plane containing axes of the upper and lower clamps, respectively, and having a pivotal connection to said lower clamp at the pivoting axis of the latter so that angular displacement of said lever is a function of, and occurs in response to, only bodily movement of said lower clamp in said direction of the longitudinal axis of said guideway.

9. In an extensometer, the combination including upper and lower clamps each having a pair of opposed screws for gripping diametrically opposite points on the surface of a specimen, said clamps being arranged with the axes of their respective pairs of screws lying in a common flat plane and spaced apart to grip a specimen at locations spaced apart along the latter, a frame, means mounting said upper clamp on said frame for pivoting relative to the latter about an axis which is perpendicular to said flat plane containing the axes of the pairs of screws, means on said frame defining parallel sides of a guideway which extends perpendicular to said pivoting axis of the upper clamp, resilient suspension means mounting said lower clamp on said frame and constrained between said sides of the guideway to permit bodily movement of the lower clamp only in the direction of the longitudinal axis of said guideway while permitting pivotal movement of said lower clamp about an axis that remains parallel to said pivoting axis of the upper clamp and that lies in a plane containing both said pivoting axis of the upper clamp and the longitudinal axis of said guideway, a rockable lever mounted on said frame for angular displacement about an axis perpendicular to said plane containing the pivoting axes of the upper and lower clamps, respectively, and having a pivotal connection to said lower clamp at the pivoting axis of the latter so that angular displacement of said lever is a function of, and occurs in response to, only bodily movement of said lower clamp in said direction of the longitudinal axis of said guideway, and locking means operative, in one position, to hold said clamps with the axes of the related pairs of screws parallel to each other and spaced apart by a predetermined distance and, in another position, to limit the movements of said lower clamp toward and away from said upper clamp for determining the operating range of the extensometer.

10. In an extensometer, the combination including upper and lower clamps each having a pair of opposed screws for gripping diametrically opposite points on the surface of a specimen, and clamps being arranged with the axes of their respective pairs of screws lying in a common flat plane and spaced apart to grip a specimen at locations spaced apart along the latter, a frame, means mounting said upper clamp on said frame for pivoting relative to the latter about an axis which is perpendicular to said flat plane containing the axes of the pairs of screws, means on said frame defining parallel sides of a guideway which extends perpendicular to said pivoting axis of the upper clamp, resilient suspension means mounting said lower clamp on said frame and constrained between said sides of the guideway to permit bodily movement of the lower clamp only in the direction of the longitudinal axis of said guideway while permitting pivotal movement of said lower clamp about an axis that remains parallel to said pivoting axis of the upper clamp and that lies in a plane containing both said pivoting axis of the upper clamp and the longitudinal axis of said guideway, a rockable lever mounted on said frame for angular displacement about an axis perpendicular to said plane containing the pivoting axes of the upper and lower clamps, respectively, and having a pivotal connection to said lower clamp at the pivoting axis of the latter so that angular displacement of said lever is a function of, and occurs in response to, only bodily movement of said lower clamp in said direction of the longitudinal axis of said guideway, a locking plunger slidable in said frame in a direction parallel to said pivoting axes of the upper and lower clamps, and relatively slidable members extending from said clamps radially with respect to the related pivoting axes and having openings therein adapted to register with each other when the axes of the pairs of screws of the upper and lower clamps are parallel to each other and spaced apart by a predetermined distance, said plunger being movable to extend from said frame into said openings for holding the latter in register with each other.

11. In an extensometer, the combination including upper and lower clamps each having a pair of opposed screws for gripping diametrically opposite points on the surface of a specimen, said clamps being arranged with the axes of their respective pairs of screws lying in a common flat plane and spaced apart to grip a specimen at locations spaced apart along the latter, a frame, means mounting said upper clamp on said frame for pivoting relative to the latter about an axis which is perpendicular to said flat plane containing the axes of the pairs of screws, means on said frame defining parallel sides of a guideway which extends perpendicular to said pivoting axis of the upper clamp, resilient suspension means mounting said lower clamp on said frame and constrained between said sides of the guideway to permit bodily movement of the lower clamp only in the direction of the longitudinal axis of said guideway while permitting pivotal movement of said lower clamp about an axis that remains parallel to said pivoting axis of the upper clamp and that lies in a plane containing both said pivoting axis of the upper clamp and the longitudinal axis of said guideway, a rockable lever mounted on said frame for angular displacement about an axis perpendicular to said plane containing the pivoting axes of the upper and lower clamps, respectively, and having a pivotal connection to said lower clamp at the pivoting axis of the latter so that angular displacement of said lever is a function of, and occurs in response to, only bodily movement of said lower clamp in said direction of the longitudinal axis of said guideway, overlapping, relatively slidable members extending from said clamps radially with respect to the related pivoting axes of the latter and having openings therein adapted to register with each other when the axes of the pairs of screws of the upper and lower clamps are parallel to each other and spaced apart by a predetermined distance, and a plunger slidable in said frame in a direction parallel to said pivoting axes of the upper and lower clamps and disposed for alignment with said openings when the latter register with each other, said plunger including a body adapted to fit closely in said openings, an end portion of relatively small cross-section and a tapering portion intermediate said body and end portion, said plunger being movable between an extended position wherein said body engages in said openings and a retracted position wherein said end portion loosely engages in said openings to limit the bodily movement of said lower clamp relative to said upper clamp and thereby determine the operating range of the extensometer.

12. In an extensometer, the combination including upper and lower clamps each having a pair of opposed screws for gripping diametrically opposite points on the surface of a specimen, said clamps being arranged with the axes of their respective pairs of screws lying in a common flat plane and spaced apart to grip a specimen at locations spaced apart along the latter, a frame, means mounting said upper clamp on said frame for pivoting relative to the latter about an axis which is perpendicular to said flat plane containing the axes of the pairs of screws, means on said frame defining parallel sides of a guideway which extends perpendicular to said pivoting axis of the upper clamp, a resilient suspension member including a cross-portion, depending legs at the opposite ends of said cross-portion and slidably guided between said parallel sides of the guideway and an extension directed rearwardly from the center of said cross-portion and secured to said frame, the lower ends of said legs being secured to said lower clamp, a resilient strip secured, at one end, to said lower clamp, and extending parallel to said rearwardly directed extension of the suspension member, means pivotally mounting said strip on said frame so that said legs can rock relative to said cross-portion and said extension and strip can twist to permit pivoting of said lower clamp about an axis parallel to said pivoting axis of the upper clamp, while said extension and strip can swing, in parallel, relative to said frame to permit bodily movement of said lower clamp along said guideway with said pivoting axes of the clamps remaining parallel to each other, a rockable lever mounted on said frame for angular displacement about an axis perpendicular to the plane containing said parallel pivoting axes of the clamps, and means pivotally connecting said lever to said lower clamp at said pivoting axis of the latter so that angular displacement of said lever is a function of, and occurs in response to, only bodily movement of said lower clamp along said guideway.

13. In an extensometer, the combination including upper and lower clamps each having a pair of opposed screws for gripping diametrically opposite points on the surface of a specimen, said clamps being arranged with the axes of their respective pairs of screws lying in a common flat plane and spaced apart to grip a specimen at locations spaced apart along the latter, a frame, means mounting said upper clamp on said frame for pivoting relative to the latter about an axis which is perpendicular to said flat plane containing the axes of the pairs of screws, means on said frame defining parallel sides of a guideway which extends perpendicular to said pivoting axis of the upper clamp, a resilient suspension member including a cross-portion, depending legs at the opposite ends of said cross-portion and slidably guided between said parallel sides of the guideway and an extension directed rearwardly from the center of said cross-portion and secured to said frame, the lower ends of said legs being secured to said lower clamp, a resilient strip secured, at one end, to said lower clamp, and extending parallel to said rearwardly directed extension of the suspension member, means pivotally mounting said strip on said frame so that said legs can rock relative to said cross-portion and said extension and strip can twist to permit pivoting of said lower clamp about an axis parallel to said pivoting axis of the upper clamp, while said extension and strip can swing, in parallel, relative to said frame to permit bodily movement of said lower clamp along said guideway with said pivoting axes of the clamps remaining parallel to each other, a rockable lever mounted on said frame for angular displacement about an axis perpendicular to the plane containing said parallel pivoting axes of the clamps, and a pin having a conical tip projecting from said lever at one end of the latter, and a bearing plate on said lower clamp having a socket located on said pivoting axis of the lower clamp and receiving said tip so that said lever is angularly displaced only in response to bodily movement of said lower clamp along said guideway and is unaffected by pivoting of said clamps relative to said frame.

14. In an extensometer, the combination including upper and lower clamps each having a pair of opposed screws for gripping diametrically opposite points on the surface of a specimen, said clamps being arranged with the axes of their respective pairs of screws lying in a common flat plane and spaced apart to grip a specimen at locations spaced apart along the latter, a frame, means mounting said upper clamp on said frame for pivoting relative to the latter about an axis which is perpendicular to said flat plane containing the axes of the pairs of screws, means on said frame defining parallel sides of a guideway which extends perpendicular to said pivoting axis of the upper clamp, a resilient suspension member including a cross-portion, depending legs at the opposite ends of said cross-portion and slidably guided between said parallel sides of the guideway and an extension directed rearwardly from the center of said cross-portion and secured to said frame, the lower ends of said legs being secured to said lower clamp, a resilient strip secured, at one end, to said lower clamp, and extending parallel to said rearwardly directed extension of the suspension member, means pivotally mounting said strip on said frame so that said legs can rock relative to said cross-portion and said extension and strip can twist to permit pivoting of said lower clamp about an axis parallel to said pivoting axis of the upper clamp, while said extension and strip can swing, in parallel, relative to said frame to permit bodily movement of said lower clamp along said guideway with said pivoting axes of the clamps remaining parallel to each other, a rockable lever mounted on said frame for angular displacement about an axis perpendicular to the plane containing said parallel pivoting axes of the clamps, and a pin having a conical tip projecting from one end of said lever, a bearing plate on said lower clamp having a socket receiving said tip and disposed on said pivoting axis of the lower clamp so that said lever is angularly displaced only in response to bodily movement of the lower clamp along said guideway, a differential transformer mounted on said frame parallel to said guideway and having an armature movable to vary the output thereof, and means actuated by said lever to move said armature in response to angular displacement of said lever so that the varied output of the transformer is adapted to control an indicator of the elongations of a stressed specimen gripped by said clamps.

15. In an extensometer, the combination as in claim 14, further including locking means manually actuable between retracted and extended positions and operative to limit the relative body movement of said upper and lower clamps, when in said retracted position, thereby to determine the operating range of the variations of the output of said transformer, and to hold said clamps relative to each other with said axes of the pairs of screws being parallel and spaced apart by a predetermined distance, when said locking means is in said extended position, thereby to establish a uniform output for said transformer.

References Cited in the file of this patent

UNITED STATES PATENTS

| | | |
|---|---|---|
| 2,500,836 | Lathrop | Mar. 14, 1950 |
| 2,578,066 | Hyde | Dec. 11, 1951 |